United States Patent [19]

Terry et al.

[11] Patent Number: 5,641,174
[45] Date of Patent: Jun. 24, 1997

[54] FIFTH WHEEL LOCKING MECHANISM

[75] Inventors: Jeff M. Terry; Dennis E. Greer, both of Birmingham; Hollis L. Cahela, Sr., Shelby; Howard Thomas Moulton, Birmingham, all of Ala.

[73] Assignee: Fontaine Fifth Wheel Company, Birmingham, Ala.

[21] Appl. No.: 441,572

[22] Filed: May 15, 1995

[51] Int. Cl.⁶ ........................................ B62D 53/12
[52] U.S. Cl. ........................................ 280/434
[58] Field of Search ........................ 280/434, 435, 280/436, 433, 437

[56] References Cited

U.S. PATENT DOCUMENTS

| | | | |
|---|---|---|---|
| 2,371,750 | 3/1945 | Fontaine et al. | 280/434 |
| 3,318,616 | 5/1967 | Fontaine et al. | 280/434 |
| 3,630,545 | 12/1971 | Fontaine | 280/434 |
| 3,844,584 | 10/1974 | Fontaine | 280/434 |
| 4,140,328 | 2/1979 | Fontaine | 280/434 |
| 4,477,100 | 10/1984 | Elyalcim | 280/434 |
| 4,946,183 | 8/1990 | Benson et al. | 280/434 |
| 5,516,138 | 5/1996 | Fontaine | 280/434 |

*Primary Examiner*—Kevin Hurley
*Attorney, Agent, or Firm*—Veal & Associates

[57] ABSTRACT

A interconnection of the jaw, wedge and operating handle in a fifth wheel facilitates the provision of an indicator on a secondary locking mechanism which further insures the security of the system. In the invention, the jaw is connected to the operating handle by a pivoting timing lever which pivots off a pin on the jaw such that the jaw remains engaged with the fifth wheel until the wedge is substantially removed from engagement with the jaw. In cooperation with the primary locking mechanism, a secondary lock is provided at the end of the operating handle such that a pawl arrangement engages a stop on the fifth wheel assembly until positively released by the operator. The pawl arrangement further has a mechanical indicator which extends beyond the fifth wheel assembly and allows the operator to determine whether the king pin is engaged and the secondary lock is activated.

16 Claims, 3 Drawing Sheets

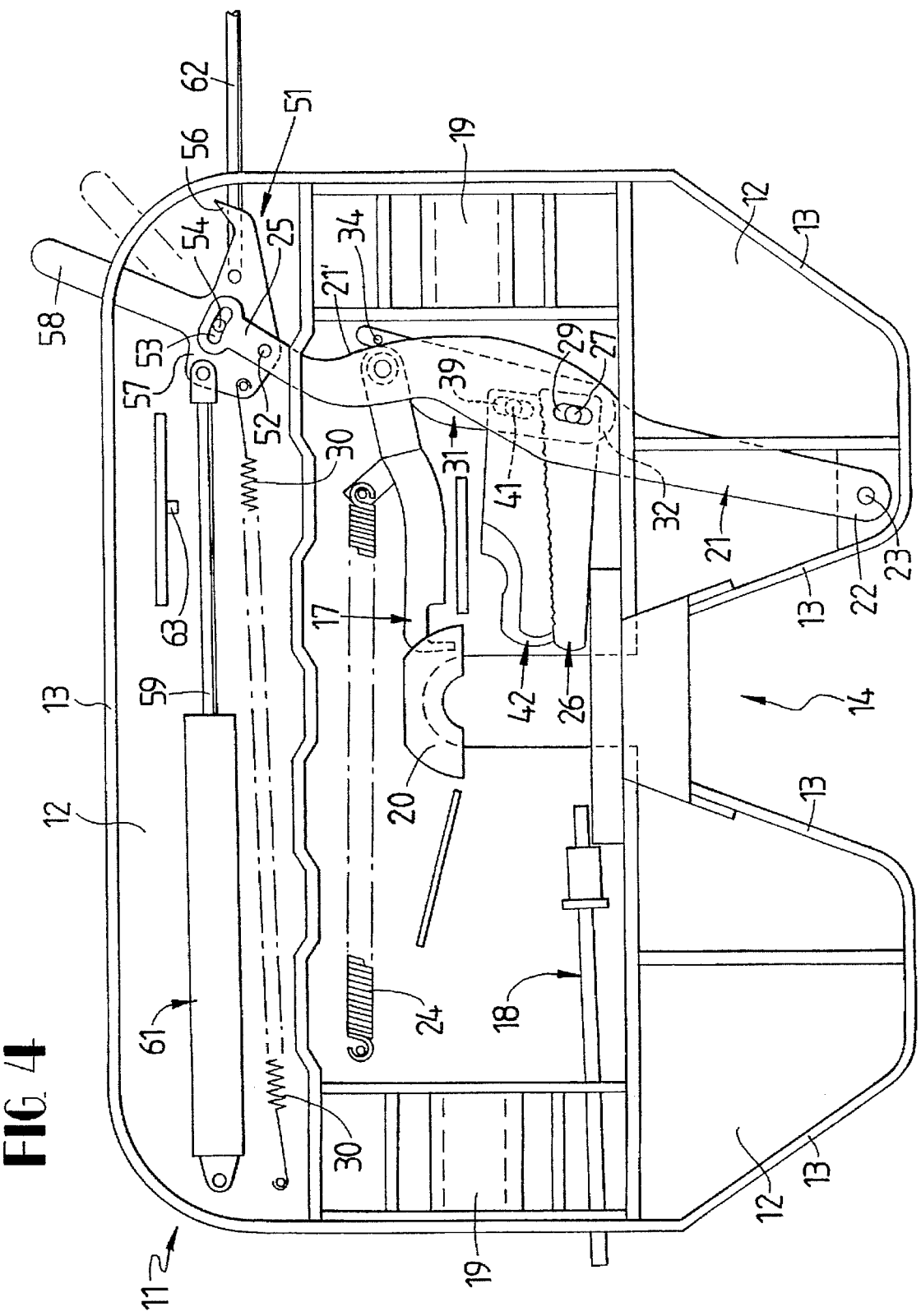

FIFTH WHEEL LOCKING MECHANISM

FIELD OF THE INVENTION

The present invention relates to the field of vehicles and apparatus for connecting carriages to be towed by vehicles. More particularly the present invention relates to the class of connections generally known as fifth wheels wherein a locking assembly on a towing vehicle engages a kingpin on a towed carriage for secure connection of the two, while allowing pivotal motion about the axis of the kingpin. In even greater particularity, the present invention relates to improvements in the locking mechanism employed by such fifth wheel apparatus.

BACKGROUND

The prior art is replete with variations on fifth wheel assemblies for coupling a towed trailer to a towing tractor. The variety of units share a locking assembly carried by the tractor to engage a depending king pin carried by the trailer. The locking assembly relied on in the past has included a resiliently loaded jaw member which closes about the king pin to secure it against a fixed seat in the fifth wheel. In some instances a wedge has been used to hold the jaw in cooperative locking relationship. Resilient members have been biased to urge the components into cooperative relationship. When the king pin is to be released from the fifth wheel, it is sometimes necessary to apply extraordinary force to disengage the components. Even when the components are not "frozen" by accumulated grit or excessive force applied in locking the apparatus, in excess of 120 pounds of force is often necessary to open the fifth wheel, therefore, a degree of physical prowess is required to operate the device. Exemplary of the prior art in this field are the following U.S. Pat. Nos.: 2,371,750; 3,318,616; 3,630,545; 3,844,854; and, 4,140,328.

Despite the numerous patents on fifth wheel technology, there remains a need for a fifth wheel which securely locks the king pin such that "squirting", i.e., inadvertent disengagement, is avoided, yet, which can be opened without excessive force.

SUMMARY OF THE INVENTION

It is the object of the present invention to improve the locking mechanism in a fifth wheel to provide improved holding strength while reducing the amount of force needed to intentionally open the lock.

Another object of the invention is to provide a locking mechanism which can be manually or air operated.

Still another object of the invention is to provide a fifth wheel which does not require torsion springs.

A further object of the invention is to provide a fifth wheel which indicates to the driver whether the lock is properly engaged.

These and other objects and features of the invention are accomplished in my invention through the novel interconnection of the jaw, wedge and operating handle in the fifth wheel. This novel connection facilitates the provision of an indicator on a secondary locking mechanism which further insures the security of the system. In the invention, the jaw is connected to the operating handle by a pivoting timing lever which pivots off a pin on the wedge such that the jaw remains engaged with the fifth wheel until the wedge is substantially removed from engagement with the jaw. In cooperation with the primary locking mechanism, a secondary lock is provided at the end of the operating handle such that a pawl arrangement engages a stop on the fifth wheel assembly until positively released by the operator. The pawl arrangement further has a mechanical indicator which extends beyond the fifth wheel assembly and allows the operator to determine whether the king pin is engaged and the secondary lock is activated.

BRIEF DESCRIPTION OF THE DRAWINGS

Apparatus embodying features of the present invention are depicted in the accompanying drawings, which form a portion of this disclosure and wherein.

DESCRIPTION OF THE PREFERRED EMBODIMENT

Figure 1:
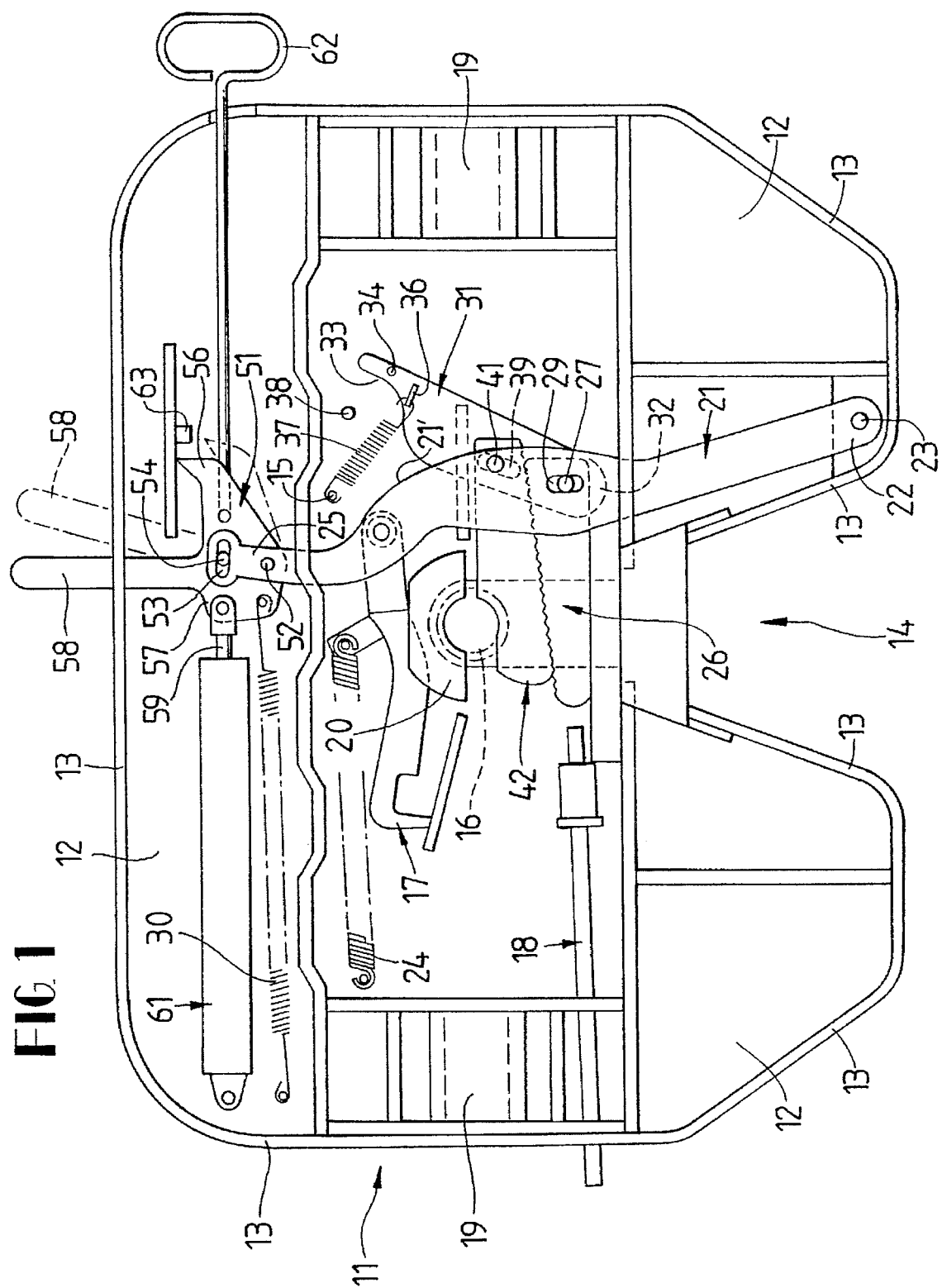
FIG. 1 is a bottom view of a fifth wheel embodying features of our invention, with the locking mechanism in the closed position.

Referring to the drawings for a more complete understanding of the invention it may be seen that our invention resides in a locking mechanism for a fifth wheel. In the description the fifth wheel or fifth wheel assembly 11 will refer to the top plate 12 and a peripheral flange 13, which are generally formed to define a receiving throat 14 in which a king pin 16 depending from a trailer is received. Fifth wheel assembly 11 further includes the gussets and flanges necessary to give strength and support to the top plate and peripheral flange, and includes the bumper sub-assembly 17 and the knock-out sub-assembly 18, as well as the mounting means 19 for mounting the fifth wheel to the tractor. The locking mechanism which constitutes the improvement to the fifth wheel art is cooperatively mounted to the fifth wheel assembly 11.

As may be seen in FIG. 1, an operating handle 21 has a first end 22 pivotally mounted to fifth wheel assembly 11 proximal throat 14 at pivot axis 23 by means of a conventional bolt, spacers, and fasteners. Operating handle 21 is an elongated handle extension member extending past the throat 14 and operatively connected to the bumper sub assembly 17 for concomitant motion therewith relative to pivot axis 23. Bumper sub-assembly 17 is pivotally mounted to operating handle 21 and supported conventionally in the fifth wheel assembly 11. One coil spring 24 biases the bumper assembly and a second coil spring 30 biases the locking and indicator assembly toward a closed position relative to the throat 14. Operating handle 21 is also connected to a wedge member 26 by a pin 27, which may be formed on the wedge member 26 or inserted therein. Pin 27 is received in a slot 29 formed in operating handle at an angle offset from the longitudinal axis of the operating handle 21 to allow the wedge 26 to move in a straight line as the operating handle 21 pivots in an arc about axis 23. A timer lever 31 also referred to as a timing lever has a first end 32 mounted to pin 27 such that the timer lever 31 may pivot about the pin 41 as the wedge 26 moves linearly. Timer lever 31 has a second end which has a camming surface 33 formed thereon and a follower pin 34 extending therefrom. It should be noted that the operating handle 21, wedge 26, and timer lever 31 are all generally plate-like members and are in stacked relation to one another about their common connection at pin 27. Follower pin 34 extends from timer lever 31 in the direction of operating handle 21 and is designed for cooperative engagement with an edge 21' thereof during the operation of the locking mechanism.

Extending from timer lever 31 on the opposite side thereof is a spring bracket 36 which is connected to one end of an extension spring 37. Spring 37 is secured at its other end to fifth wheel assembly 11 at a bracket 15, such that the timer lever 31 is biased for pivotal rotation about pin 41 toward throat 14. A camming pin 38 is mounted to fifth wheel assembly 11 intermediate bracket 15 and the camming surface 33 on timer lever 31. Timer lever 31 also has formed therein an elongated slot 39 which is spaced from and extends radially from pin 27. Slot 39 receives therein a pivot pin 41 which extends from a jaw member 42. Jaw member 42 is cooperatively positioned with wedge member 26 in accordance with the known operation of fifth wheels such that when a king pin is received in throat 14, wedge member 26 abuts and urges the jaw member into locked engagement therewith to lock the kingpin against fixed jaw 20. Jaw member 42 is connected to operating handle 21 only through pin 41, timer lever 31, and pin 27. Extension spring 37 biases timer lever 31 toward the throat such that the lever 31 is urged about pin 41 against pin 27 as seen in FIG. 1.

Operating handle 21 has a second end 25 which carries a locking and indicator assembly 51. Assembly 51 is pivotally connected to end 25 by a pin 52 for pivotal motion in a plane substantially parallel to the plane of motion of operating handle 21. End 25 has a transverse arcuate slot 53 formed therein, which receives a stabilizing pin 54 extending from assembly 51. Assembly 51 is essentially a plate having a pawl element 56 extending from and forming one margin thereof and a dog 57 extending from and forming an opposite margin with pin 54 intermediate the margins. Also intermediate pawl 56 and dog 57 and extending radially away from pin 54 is an indicating vane 58 which extends beyond the peripheral flange 13 of assembly 11. Dog 57 is connected by a pin and clevis or other suitable connection to an end of a rod 59 of a linear actuator 61 mounted to fifth wheel assembly 11 and connected to a remote source of fluid for selective activation. In some instances actuator 61 may be augmented with an extension spring or may have an internal return spring such that retraction of rod 61 urges assembly 51 about pin 52 toward dog 57.

Pawl 56 is pivotally connected to a pull handle 62 which extends beyond the fifth wheel assembly 11 as is commonly known, however, the pawl 56 and handle 62 are biased inwardly by actuator 61 and coil spring 30 such that pawl 56 is seated behind a stop 63 formed on the fifth wheel assembly 11. Accordingly, it may be seen in FIG. 1 that rotation of operating handle 21 about the pivot axis 23 due to an attempt of the wedge 26 to squirt, will result in pawl 56 abutting against stop 63. Therefore, it may be seen that the operating handle 21 can only be moved to the open position shown in FIG. 4 after assembly 51 has been pivoted by actuator 61 or handle 62 to move pawl 56 such that it will not engage stop 63.

Figure 2:
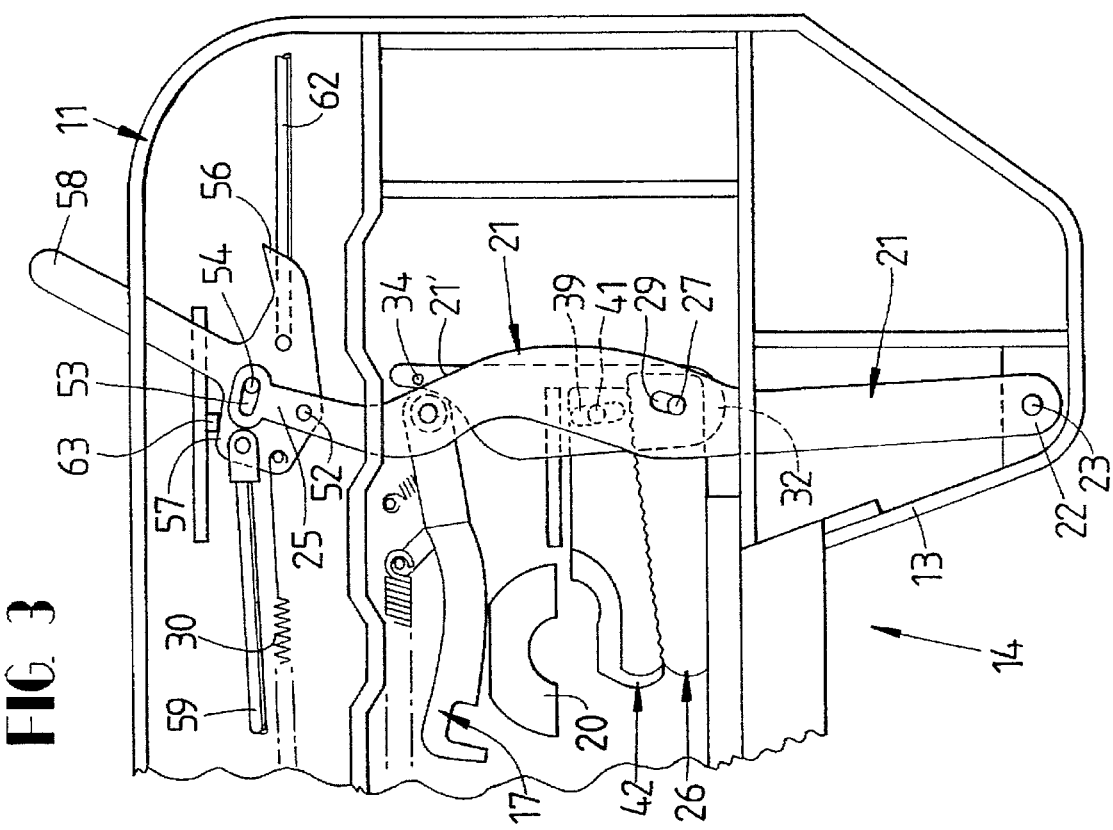
FIG. 2 is a partial bottom view of a fifth wheel with the locking mechanism moved toward an open position.
Figure 3:
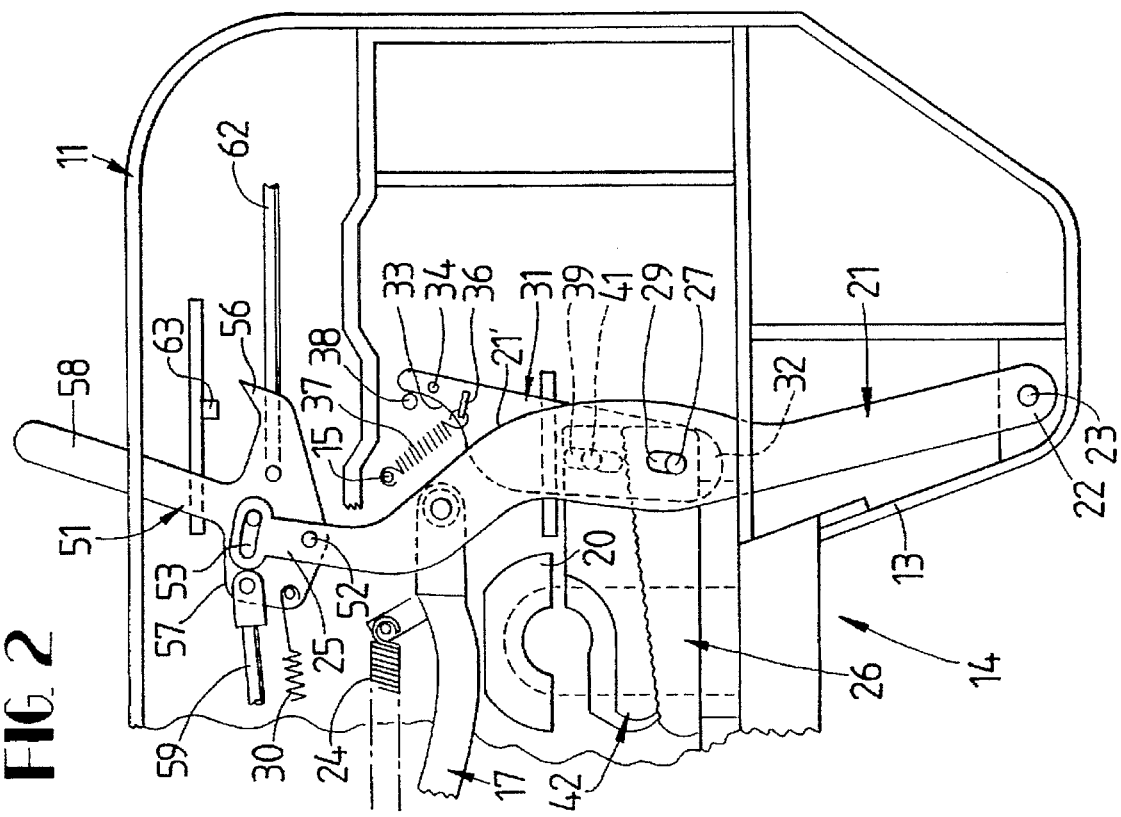
FIG. 3 is another partial bottom view showing the locking mechanism being opened; and, FIG. 4 is a bottom view of a fifth wheel showing the locking mechanism in the open position.

The operation of the mechanism can be understood by considering the drawings. In FIG. 1, the wedge 26 and jaw 42 are in the closed locked position and operating handle 21 is in its proper closed position. Assembly 51 is rotated to the closed position by the retracted rod 59 and coil spring 30, such that indication vane 58 is positioned toward the center of the fifth wheel assembly. A template or other marking may be affixed to the exterior of the fifth wheel assembly to provide a visual cue to the operator that the vane 58 is in the "locked indication" position. With reference to FIG. 2, either actuator 61 or handle 62 has been used to apply force to assembly 51 to rotate it toward pawl 56, thereby moving the pawl to clear stop 63. Further force on the assembly begins moving the operating handle 21 about pivot axis 23, causing wedge 26 to move linearly away from its locking position. As wedge 26 moves, extension spring 37 urges the second end of timer lever 31 toward camming pin 38 until camming surface 33 abuts the pin 38. As operating handle 21 continues to move to the open position, wedge 26 and pin 27 move concomitantly, carrying the first end of lever 31 outwardly and now pivoting the lever 31 on camming pin 38 causing jaw 42 to begin disengaging the king pin 16, until side 21' of the operating handle engages follower pin 34 to carry the lever wedge and jaw to the fully open position of FIG. 4. It will be understood that the bumper assembly 17 moves and operates in the conventional manner. It should also be noted that the displacement of the wedge from the locked position is greater than in the prior art devices, thus insuring less likelihood of damage, yet requiring less force to open.

While we have shown our invention in one form, it will be obvious to those skilled in the art that it is not so limited but is susceptible of various changes and modifications without departing from the spirit thereof.

What we claim is:

1. In a fifth wheel assembly for securing a trailer to a tractor wherein said trailer carries thereon a depending king pin for engaging a receptacle in a fifth wheel assembly, an apparatus for releasably locking said king pin into said fifth wheel, comprising in combination:

a) a jaw member selectively movable between a closed position securing said king pin against a fixed jaw formed in said fifth wheel assembly and an open position;

b) a movable wedge member for holding said jaw member in engagement with said king pin in said closed position;

c) an elongated handle extension member pivotally mounted at one end thereof to said fifth wheel assembly and connected at an a second end thereof to a means for visually indicating externally of said fifth wheel assembly whether said jaw member is in said closed position, said means for visually indicating including a pawl pivotally mounted to and carried by said extension member proximal said second end, said pawl being selectively movable between a locking position and an openable position comprising an indicating vane extending outwardly beyond said fifth wheel at a first location when said jaw member is in said closed position, and a stop engaging pawl element extending proximal a stop formed in said fifth wheel assembly in said locking position such that said movement of said extension member urges said pawl element against said stop, said means for visually indicating further including a linear actuator mounted to said fifth wheel assembly and connected to said pawl for biasing said pawl with said pawl element proximal said stop such that extension and retraction of said actuator pivots said pawl relative to said extension member; and d) a timing lever for attaching said wedge member to said handle extension member and said jaw member such that said handle extension member urges said wedge member out of holding engagement with said jaw member prior to movement of said jaw member from said closed position to said open position, said timing lever having a first and second end, said first end having an aperture formed there through for receiving therein a pin extending normal to said wedge member and pivotally connecting said wedge member to said handle extension, said timing lever having an elongated slot therein for slidably receiving a pivot pin extending from and normal to said jaw member, and means connected to said timing lever proximal said second end for biasing said second end toward a stop pin on said fifth wheel assembly, such that said biasing means urges said timing lever against said pivot pin.

2. In a fifth wheel assembly for securing a trailer to a tractor wherein said trailer carries thereon a depending king pin for engaging a receptacle in a fifth wheel assembly, an apparatus for releasably locking said king pin into said fifth wheel, comprising in combination:

a) a jaw member selectively movable between a closed position securing said king pin against a fixed jaw formed in said fifth wheel assembly and an open position;

b) a movable wedge member for holding said jaw member in engagement with said king pin in said closed position;

c) an elongated handle extension member pivotally mounted at one end thereof to said fifth wheel assembly; and d) a timing lever for attaching said wedge member to said handle extension member and said jaw member such that said handle extension member urges said wedge member out of holding engagement with said jaw member prior to movement of said jaw member from said closed position to said open position, said timing lever having a first and second end, said first end having an aperture formed there through for receiving therein a pin extending normal to said wedge member and pivotally connecting said wedge member to said handle extension, said timing lever having an elongated slot therein for slidably receiving a pivot pin extending from and normal to said jaw member, and means connected to said timing lever proximal said second end for biasing said second end toward a stop pin on said fifth wheel assembly, such that said biasing means urges said timing lever against said pivot pin.

3. Apparatus as defined in claim 2 wherein said timing lever has formed on said second end a camming surface cooperatively positioned for engagement with said stop pin upon rotation of said timing lever about said pivot pin.

4. Apparatus as defined in claim 2 wherein said timing lever has affixed thereto a follower pin extending normal thereto such that it may be engaged by said extension member to urge said timing lever and jaw member to said open position.

5. In a fifth wheel assembly for securing a trailer to a tractor wherein said trailer carries thereon a depending king pin for engaging a receptacle in a fifth wheel assembly, an apparatus for releasably locking said king pin into said fifth wheel, comprising in combination:

a) a jaw member selectively movable between a closed position securing said king pin against a fixed jaw formed in said fifth wheel assembly and an open position;

b) a movable wedge member for holding said jaw member in engagement with said king pin in said closed position;

c) an elongated handle extension member pivotally mounted at one end thereof to said fifth wheel assembly;

d) means for attaching said wedge member to said handle extension member and said jaw member such that said handle extension member urges said wedge member out of holding engagement with said jaw member prior to movement of said jaw member from said closed position to said open position; and e) locking means comprising a generally plate shaped member pivotally mounted to and carried by said extension member proximal a second end thereof for selective pivotal movement to a locking position and an openable position, and opening means connected to said plate shaped member for use in conjunction with said handle extension member to move said jaw from said closed position to said open position.

6. The apparatus as defined in claim 5 wherein said plate shaped member further comprises a pawl extending from said plate shaped member proximal a stop formed in said fifth wheel assembly and biasing means for urging said plate shaped member to said locking position with said pawl engaging said stop.

7. The apparatus as defined in claim 6 wherein said opening means comprises a linear actuator mounted to said fifth wheel assembly and pivotally connected to said plate member such that extension of said actuator pivots said plate member relative to said handle extension member to disengage said pawl from said stop and urge said jaw to said open position.

8. The apparatus as defined in claim 6 wherein said opening means is a pull handle pivotally connected to said plate member at a position such that single linear actuation of said pull handle in a direction away from said fifth wheel assembly pivots said plate member into said openable position and urges said handle extension member to move said jaw member toward said open position.

9. The apparatus as defined in claim 6 wherein said second end of said handle extension member further includes a slot for receiving a pin formed in an interior of said plate member for guiding said selective movement of said plate member.

10. The apparatus as defined in claim 9 wherein said slot is transverse and arcuate and said pin is positioned intermediate said pawl and said biasing means.

11. The apparatus as defined in claim 5 wherein said opening means comprises a pull handle pivotally connected to said plate member at a position such that single linear actuation of said pull handle in a direction away from said fifth wheel assembly pivots said plate member into said openable position and urges said handle extension member to move said jaw member toward said open position.

12. The apparatus as defined in claim 11 wherein said second end of said handle extension member further includes a slot for receiving a pin formed in an interior of said plate member for guiding said selective movement of said plate member.

13. The apparatus as defined in claim 12 wherein said slot is transverse and arcuate and said pin is positioned intermediate said pawl and said biasing means.

14. The apparatus as defined in claim 5, wherein said means for attachment comprises a timing lever having a first and second end, said first end having an aperture formed there through for receiving therein a pin extending normal to said wedge member and pivotally connecting said wedge member to said handle extension, said timing lever having an elongated slot therein for slidably receiving a pivot pin extending from and normal to said jaw member, and means connected to said timing lever proximal said second end for biasing said second end toward a stop pin on said fifth wheel assembly, such that said biasing means urges said timing lever against said pivot pin.

15. The apparatus as defined in claim 14 wherein said timing lever has formed on said second end a camming surface cooperatively positioned for engagement with said stop pin upon rotation of said timing lever about said pivot pin.

16. The apparatus as defined in claim 14 wherein said timing lever has affixed thereto a follower pin extending normal thereto such that it may be engaged by said extension member to urge said timing lever and jaw member to said open position.

* * * * *